(12) United States Patent
Murakami

(10) Patent No.: US 12,107,999 B2
(45) Date of Patent: Oct. 1, 2024

(54) PRINTER FOR PROVIDING A NOTIFICATION WHEN TWO REGIONS OVERLAP BETWEEN A SCAN IMAGE AND A REFERENCE IMAGE

(71) Applicant: CANON KABUSHIKI KAISHA, Tokyo (JP)

(72) Inventor: Katsuyuki Murakami, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 17/820,527

(22) Filed: Aug. 17, 2022

(65) Prior Publication Data

US 2023/0058026 A1 Feb. 23, 2023

(30) Foreign Application Priority Data

Aug. 23, 2021 (JP) ................. 2021-135584

(51) Int. Cl.
*H04N 1/00* (2006.01)
(52) U.S. Cl.
CPC ..... *H04N 1/00076* (2013.01); *H04N 1/00005* (2013.01); *H04N 1/00039* (2013.01); *H04N 1/00824* (2013.01)
(58) Field of Classification Search
None
See application file for complete search history.

(56) References Cited

U.S. PATENT DOCUMENTS

2022/0311890 A1* 9/2022 Kagawa ............. H04N 1/00702

FOREIGN PATENT DOCUMENTS

JP 2020067732 A 4/2020

* cited by examiner

*Primary Examiner* — Eric A. Rust
(74) *Attorney, Agent, or Firm* — Canon U.S.A., Inc. IP Division

(57) ABSTRACT

When a user overlaps a region set for a picture examination and a region set for a data examination, the user is not notified that a print image examination is not performed on the overlap region. A printing system reads a printout, generates a scan image, performs a first examination to examine the printout based on the scan image and a correct image, and performs a second examination to examine data acquired from the printout based on data acquired from the scan image and correct data, and in a case where at least a first region to be examined by the first examination and a second region to be examined by the second examination are set in the correct image and the first region and the second region include an overlap region, the printing system provides a notification of the overlap of the first region and the second region.

13 Claims, 13 Drawing Sheets

PRINTER FOR PROVIDING A NOTIFICATION WHEN TWO REGIONS OVERLAP BETWEEN A SCAN IMAGE AND A REFERENCE IMAGE

BACKGROUND

Field of the Disclosure

The present disclosure relates to a printing system, an examination apparatus, a method for controlling a print system, and a storage medium.

Description of the Related Art

Japanese Patent Application Laid-Open No. 2020-67732 discusses a method for generating correct image data for variable printing. Specifically, a user selects a common object region common to all pages as a print image examination target region and a unique object region with content varying between different pages as a data examination target region in one page. Then, a correct image is generated by combining the print image examination target region and the data examination target region, and a printout is examined using the generated correct image.

SUMMARY

According to embodiments of the present disclosure, a printing system includes a printing unit configured to print an image on a recording sheet, the image including a variable region where an image printed on a first page and an image printed on a second page differ and a fixed region where an image printed on the first page and an image printed on the second page are the same, a generation unit configured to read a printout printed by the printing unit and generate a scan image, a display control unit configured to display a correct image including at least the fixed region on a display unit, a first examination unit configured to examine the printout based on at least the fixed region of the scan image and the correct image, a second examination unit configured to examine data acquired from the printout based on data acquired from an image printed in the variable region of the scan image and correct data, a setting unit configured to set at least a first region to be examined by the first examination unit and a second region to be examined by the second examination unit in the correct image displayed on the display unit, and a notification unit configured to provide, in a case where the first region and the second region include an overlap region, a notification of overlap of the first region and the second region.

Further features of the present disclosure will become apparent from the following description of exemplary embodiments with reference to the attached drawings.

DESCRIPTION OF THE EMBODIMENTS

While examinations (product inspections) for checking whether printouts are correctly printed have been manually performed, apparatuses that perform examinations automatically as post-processing of printing machines are used in recent years. In such an examination apparatus, first, correct image (reference image) data is registered. Next, an image forming apparatus prints input image data on a sheet, and an internal examination sensor of the examination apparatus reads a printout obtained by the data being printed and output on the sheet. The image data read by the examination sensor and the correct image data registered at the beginning are compared to detect defects in the printout. Examinations for detecting defects in picture portions of the printouts will be referred to as "print image examination" (picture examination).

Further, an examination of a variable region portion such as a character string or a barcode in variable printing is also performed as well as the print image examination. Examples are a data readability examination of examining whether a character string or a barcode is readable and a data collation examination of collating a result of reading a character string or a barcode against a correct character string or a correct barcode. The data readability examination and the data collation examination will be referred to as "data examination". The variable printing is the printing in which elements to print on a sheet can be changed based on data.

Due to characteristics of examination methods for the print image examination and the data examination, the print image examination is unperformable on variable regions in variable printing. Specifically, since different character strings or different barcodes are printed in variable regions of different pages in variable printing, performing the print image examination on the variable regions using a single correct image provides an examination result indicating "failed". This is because it is undeterminable whether the difference is due to a defect (smudge, streak) during printing or due to a difference in data on the character string or the barcode. In a case where a print image examination target region and a data examination target region overlap, only the data examination is to be performed on the overlap region.

Thus, embodiments of the present disclosure are directed to an examination apparatus and a printing system that provide an overlap region notification in a case where a print image examination target region and a data examination target region overlap.

Various exemplary embodiments of the present disclosure will be described in detail below with reference to the attached drawings. It should be noted that the following exemplary embodiments are not intended to limit the scope of the disclosure and that not all combinations of features described in the exemplary embodiments are always essential to a technical solution of the present disclosure.

Figure 1:
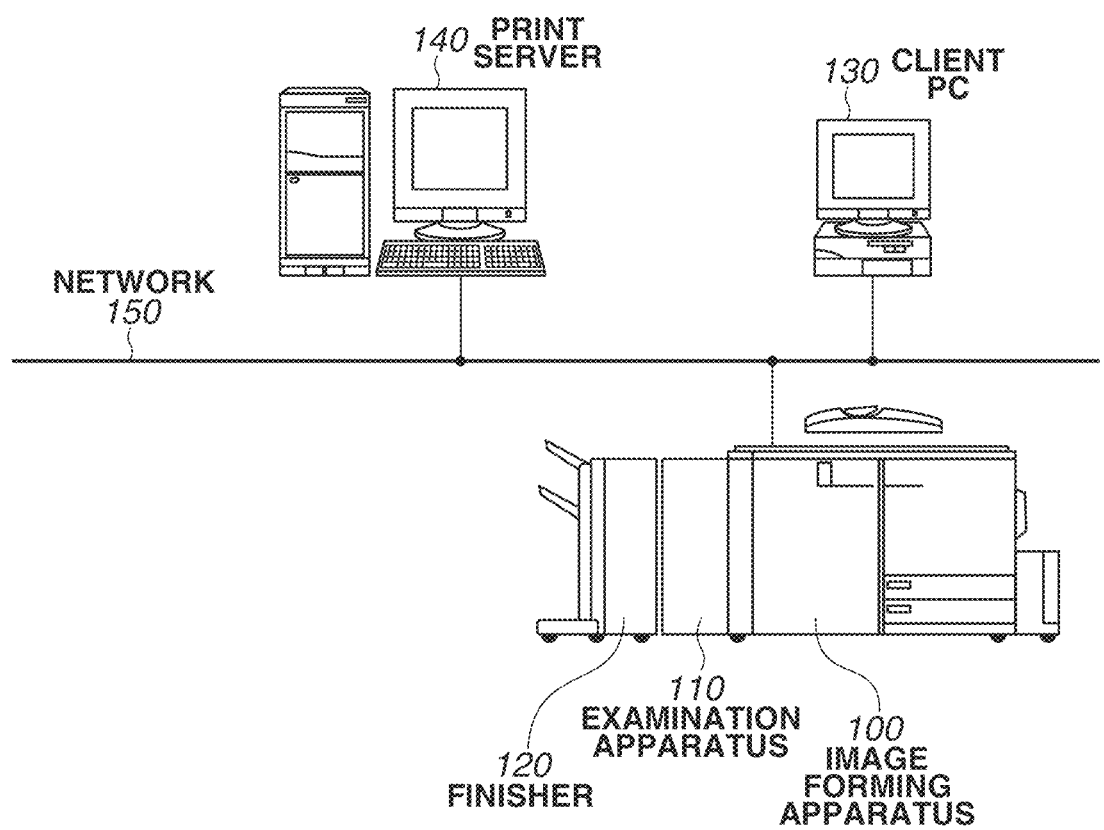
FIG. 1 is a diagram illustrating an example of a system configuration including an examination apparatus according to an exemplary embodiment of the present disclosure.

FIG. 1 is a diagram illustrating a system configuration including an examination apparatus according to an exemplary embodiment of the present disclosure.

An image forming apparatus 100, an examination apparatus 110, a finisher 120, a client personal computer (client PC) 130, a print server 140, and a network 150 are illustrated.

The image forming apparatus 100 performs print output based on various types of input data such as print data transmitted from the client PC 130 and the print server 140.

The examination apparatus 110 receives a printout output from the image forming apparatus 100 and examines whether the received printout includes defects. The term "defect" as used herein refers to something that causes a decrease in quality of a printout. Examples of defects are a smudge caused by a transfer of color materials to an unintended portion during printing and a color loss caused by an unsuccessful transfer of sufficient color materials to an intended portion.

Further, the examination apparatus 110 examines a variable region portion such as a character string or a barcode in variable printing. Examples are the data readability examination of examining whether a character string or a barcode is readable and the data collation examination of collating a result of reading a character string or a barcode against a correct character string or a correct barcode. Specifically, the examination apparatus 110 performs the print image examination and the data examination as described above.

The finisher 120 receives the output sheet examined by the examination apparatus 110, changes a sheet discharge destination based on the examination result by the examination apparatus 110, performs post-processing (such as binding) as needed, and discharges the sheet.

The image forming apparatus 100 are connected to the client PC 130 and the print server 140 via the network 150 and to the examination apparatus 110 and the finisher 120 via a communication cable. The examination apparatus 110 is also connected to the finisher 120 via a communication cable besides the image forming apparatus 100. The examination apparatus 110 according to the present exemplary embodiment is an inline examination machine that performs a series of image forming, examination, post-processing, and sheet discharge. According to the present exemplary embodiment, at least the image forming apparatus 100 and the examination apparatus 110 in combination are referred to as "printing system".

[Diagram Illustrating Configuration of Image Forming Apparatus]

Figure 2:
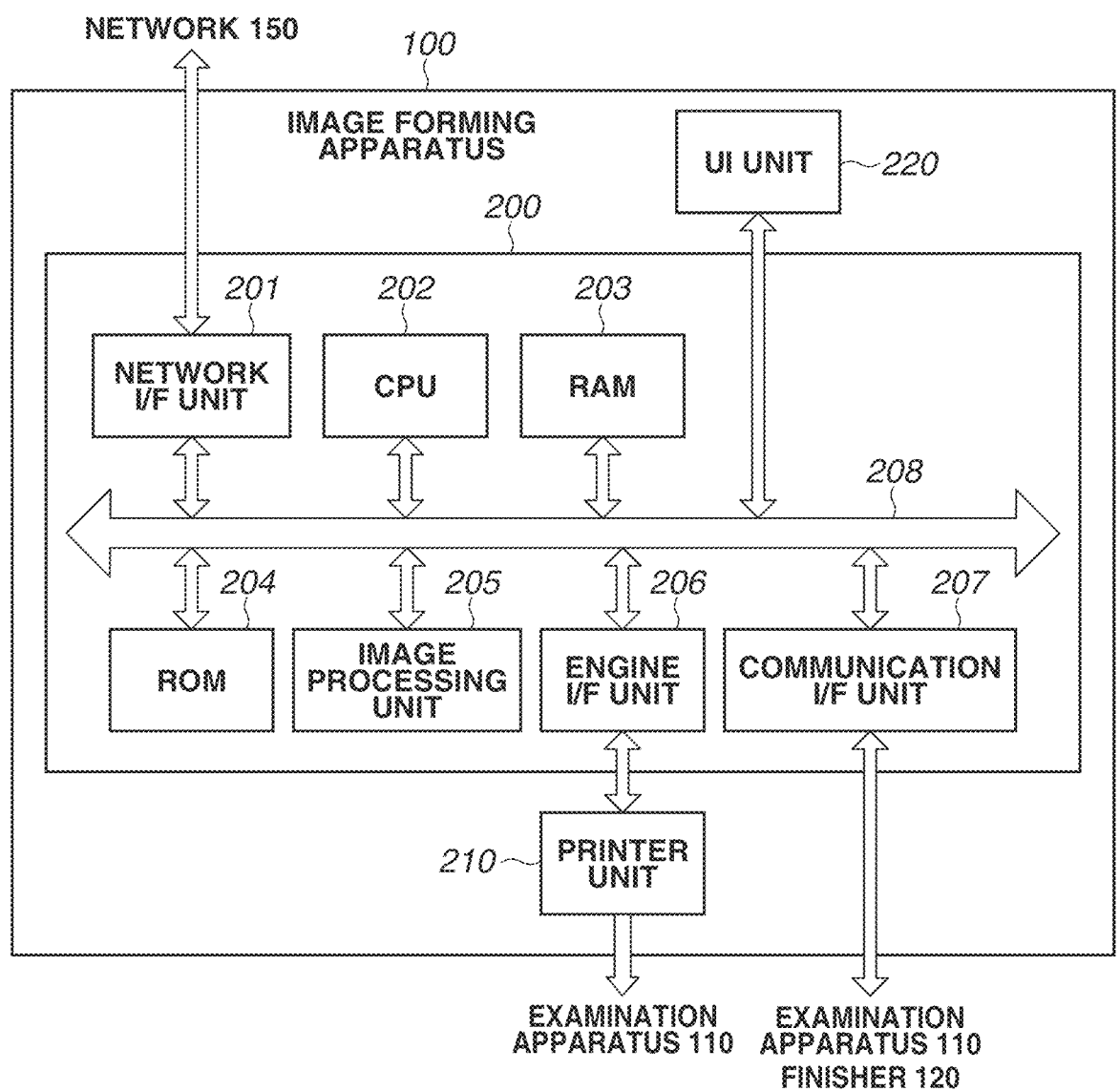
FIG. 2 is a diagram illustrating an example of an internal configuration of an image forming apparatus according to an exemplary embodiment of the present disclosure.

FIG. 2 is a diagram illustrating an internal configuration of the image forming apparatus 100 according to the present exemplary embodiment.

A controller 200 receives images and documents from the network 150 and converts the received images and documents into print data. A printer unit 210 prints the print data onto recording sheets (paper, sheet). A user interface (UI) unit 220 is for inputting user instructions such as an instruction to select sheet information to the image forming apparatus 100.

The image forming apparatus 100 includes the controller 200, the printer unit 210, and the UI unit 220.

The controller 200 includes components 201 to 208. A network interface (network I/F) unit 201 is a network I/F unit via which data is transmitted to and received from the network 150. A central processing unit (CPU) 202 controls the entire image forming apparatus 100. A random access memory (RAM) 203 is used as a work area during execution of various instructions by the CPU 202. A read-only memory (ROM) 204 stores settings data of the controller 200 and program data that is executed by the CPU 202 during activation. An image processing unit 205 performs raster image processer (RIP) processing to convert images and document data received from the network 150 into print data. Further, the image processing unit 205 can also perform RIP processing to convert image data and document data received from the network 150 into correct image data. Specifically, RIP processing for correct image data generates an image at a resolution of, for example, 300 dpi changed from 600 dpi, whereas RIP processing for print data generates an image without decreasing the resolution. An engine interface (engine I/F) unit 206 is an engine I/F unit via which print data is transmitted to the printer unit 210. A communication interface (communication I/F) unit 207 is a communication I/F unit for communicating with the examination apparatus 110 and the finisher 120. The internal configuration further includes an internal bus (system bus) 208.

Images and documents that are generated by the client PC 130 or the print server 140 on the network 150 are transmitted as page description language (PDL) data to the image forming apparatus 100 via a network (e.g., local area network). The transmitted PDL data is stored in the RAM 203 via the network I/F unit 201. Further, print instructions from the user of the UI unit 220 are also stored in the RAM 203 via the internal bus 208. The print instructions from the user are, for example, sheet type selection.

The image processing unit 205 acquires PDL data stored in the RAM 203 and performs image processing to convert the acquired PDL data into print data. The image processing to convert the acquired PDL data into print data includes, for example, rasterizing the PDL data to convert the PDL data into multivalued bitmap data and performing screen processing to convert the multivalued bitmap data into binary bitmap data. The binary bitmap data obtained by the image processing unit 205 is transmitted to the printer unit 210 via the engine I/F unit 206.

The printer unit 210 prints the received binary bitmap data on a recording sheet using color materials. The CPU 202 issues instructions to the printer unit 210 based on the print instructions from the user that are stored in the RAM 203. For example, in a case where an instruction to print on a coated sheet is received from the user, the CPU 202 instructs the printer unit 210 to output the coated sheet from a sheet cassette (not illustrated) storing the coated sheet in the image forming apparatus 100. The various types of processing from the PDL data reception to the printing on the sheet are controlled by the CPU 202 so that a full-color toner image is formed on the sheet.

[Internal Configuration of Examination Apparatus 110]

Figure 3:
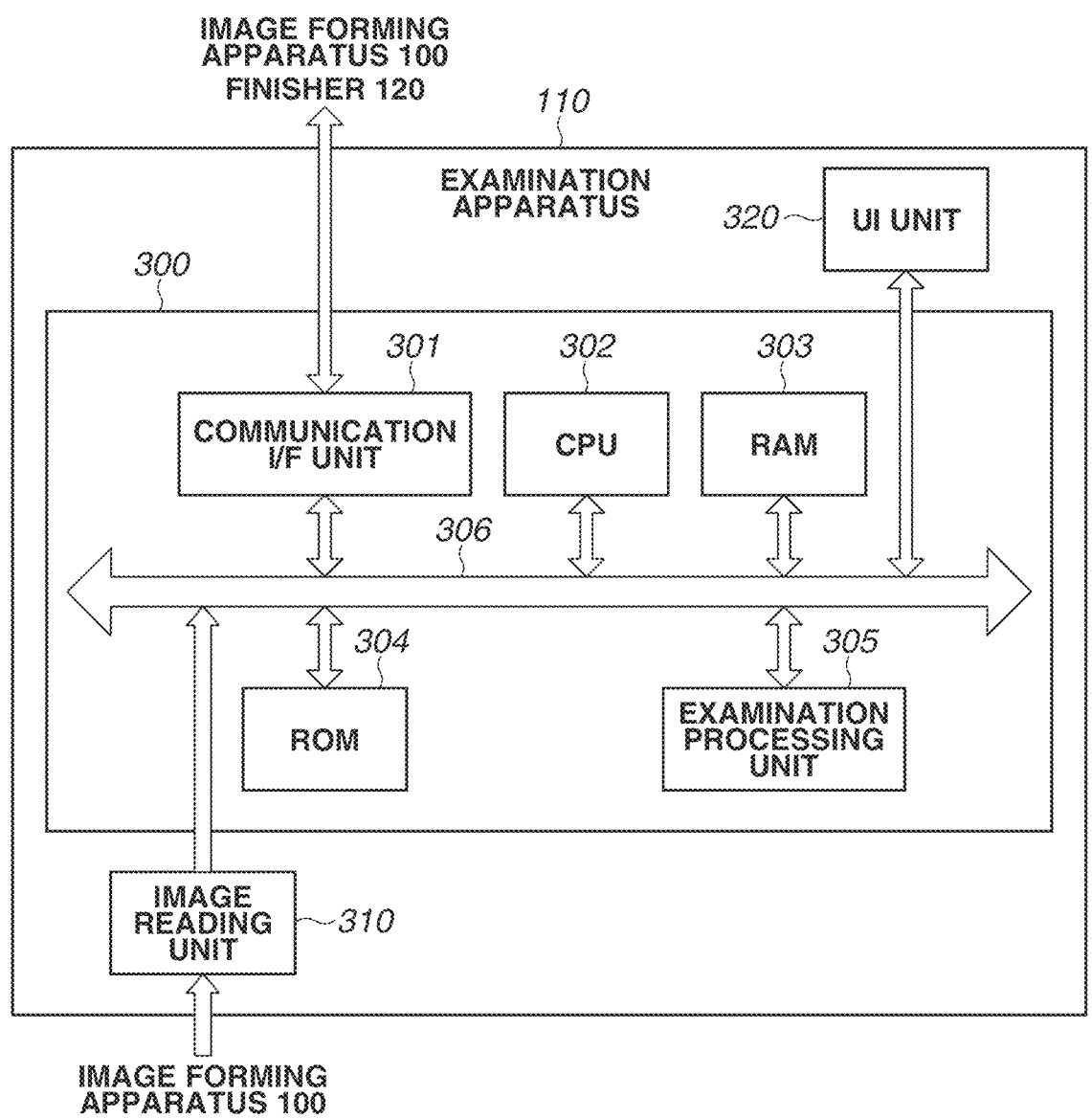
FIG. 3 is a diagram illustrating an example of an internal configuration of an examination apparatus according to an exemplary embodiment of the present disclosure.

FIG. 3 is a diagram illustrating an internal configuration of the examination apparatus 110.

An examination control unit 300 controls the entire examination apparatus 110, examines whether a printout is defective, and examines a variable region portion such as a character string or a barcode. The term "variable region" herein refers to a region where different images are printed on different pages, particularly a region where images with elements different from those of the correct image are printed. Further, a region where the same image with the same elements is printed on each page, particularly a region where an image with the same elements as the correct image is printed, will be referred to as "fixed region" according to the present exemplary embodiment.

An image reading unit 310 reads a printout conveyed from the image forming apparatus 100. A UI unit 320 is a UI unit via which the user sets settings of the examination apparatus 110 and on which an examination result is displayed to the user. The settings of the examination apparatus 110 that are set by the user are examination items indicating a type of a defect to be examined in examining a printout. Examples of examination items are a round defect (spot), a linear defect (streak), and a determination of whether a variable region portion such as a character string or a barcode is correct or incorrect. The examination apparatus 110 includes the examination control unit 300, the image reading unit 310, and the UI unit 320. According to the present exemplary embodiment, the UI unit 320 is referred to as "display unit".

The examination control unit 300 includes components 301 to 306. A communication I/F unit 301 is a communication I/F unit for communicating data with the image forming apparatus 100 and the finisher 120. A CPU 302 controls the entire examination apparatus 110. A RAM 303 is used as a work area during execution of various instructions by the CPU 302. A ROM 304 stores settings data of the examination control unit 300 and program data executed by the CPU 302 during activation. An examination processing unit 305 examines whether a printout is defective. The internal configuration further includes an internal bus (system bus) 306.

Next, an outline of the print image examination performed by the examination apparatus 110 will be described below.

The examination apparatus 110 according to the present exemplary embodiment can perform both the print image examination and the data examination.

The examination apparatus 110 reads a printout conveyed from the image forming apparatus 100 using the image reading unit 310 and acquires an examination target scan image. The acquired examination target scan image is stored in the RAM 303.

Then, the examination apparatus 110 calculates a difference value between a reference image stored in advance as a correct image in the RAM 303 and the examination target scan image using the examination processing unit 305.

Next, the examination apparatus 110 performs examination by comparing the calculated difference value with an examination threshold value (contrast and size) of each examination item for each pixel. Results of the examination are stored in the RAM 303. Examples are information about whether the examined printout includes a defect, the type (spot, streak) of the detected defect, and information about a position of the defect in displaying on the UI unit 320.

Next, an outline of the data examination performed by the examination apparatus 110 will be described below.

The examination apparatus 110 reads a printout conveyed from the image forming apparatus 100 using the image reading unit 310 and acquires an examination target scan image. The acquired examination target scan image is stored in the RAM 303.

Then, the examination apparatus 110 examines whether a character string or a barcode is readable based on a preset glyph font for optical character recognition (OCR) or a barcode standard using the examination processing unit 305. Further, the examination apparatus 110 can also perform the data collation examination to collate the result of reading the character string or the barcode against correct data and determine whether the result matches the correct data. Results of the examination are stored in the RAM 303. Examples are a result of reading a character string or a barcode from a printout, a result of collation against the correct data, and position information about a read character or a read barcode in displaying on the UI unit 320. The correct data can be stored in advance in the RAM 303 of the examination apparatus 110, or the correct data can be acquired each time via the network 150 and stored temporarily in the RAM 303.

Next, the examination apparatus 110 instructs the UI unit 320 to display the examination result stored in the RAM 303 using the CPU 302. The display of the examination result on the UI unit 320 enables the user to recognize the examination result.

Further, in a case where a predetermined number of defective printouts are consecutively output, the examination apparatus 110 transmits the information to the image forming apparatus 100 via the communication I/F unit 301 using the CPU 302.

The information about the consecutive output of defective printouts is received by the controller 200 via the communication I/F unit 207. After the controller 200 receives the information, the CPU 202 instructs the printer unit 210 to stop printing. After the printer unit 210 is instructed to stop printing, the image forming apparatus 100 stops the printing operation.

Further, the examination apparatus 110 also transmits information to the finisher 120 via the communication I/F unit 301 using the CPU 302 based on the examination result stored in the RAM 303. The information transmitted to the finisher 120 is information about whether a printout is defective. Using the received information, the finisher 120 discharges each printout without a defect to a normal sheet discharge tray and discharges each defective printout to another tray different from the normal sheet discharge tray.

Next, an entire process from the registration before an examination is started to the performance of the examination by the examination processing unit 305 will be described below with reference to a flowchart in FIG. 4.

Figure 4:
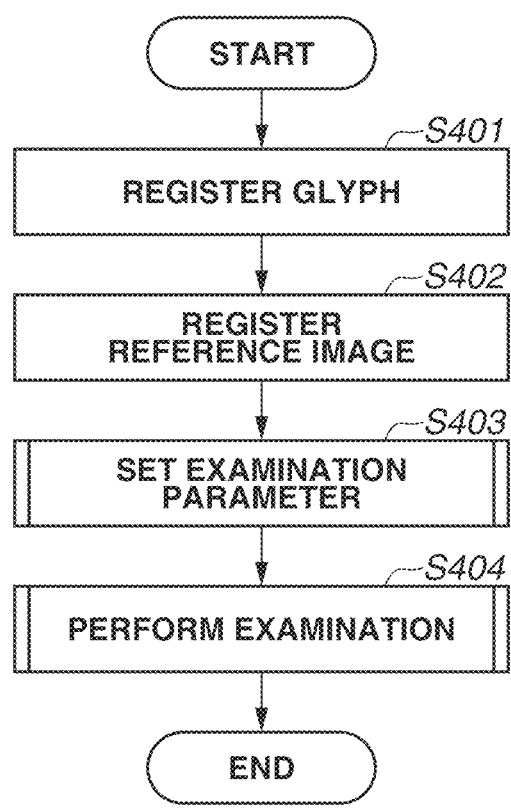
FIG. 4 is a flowchart illustrating an example of an entire examination process according to an exemplary embodiment of the present disclosure.

The process in FIG. 4 is performed by the examination apparatus 110 based on user operations from the client PC 130. At this time, program codes stored in the ROM 304 are loaded to the RAM 303, and the examination control unit 300 is controlled by the CPU 302, whereby the processing of the examination apparatus 110 is performed. Data generated during the processing by the examination apparatus 110 is temporarily stored in the RAM 303 or a storage unit (not illustrated).

First, in step S401, the examination apparatus 110 registers a glyph by generating a glyph font. The registered glyph is used in the data examination. The glyph font is data that associates glyph images of characters for use in optical character recognition (OCR) performed during the data examination with character codes.

The glyph font is generated by the following process. First, the examination apparatus 110 waits in a glyph font image reading mode and receives a print job for glyph font generation from the client PC 130. The examination apparatus 110 receives a glyph font job from the client PC 130 and reads a glyph font image. After printing is performed, the examination apparatus 110 detects a conveyed sheet, scans the sheet using the image reading unit 310, and stores the scan image in the RAM 303 of the examination apparatus 110. OCR target characters in the scan image are cut one by one, and the user inputs a character code for each cut character image, whereby the glyph font is generated. While the glyph font generation method according to the present exemplary embodiment is described above, methods are not limited to the method according to the present exemplary embodiment, and any methods that generate data associating a character code with each character image cut from a scan image can be used.

There may be a case where only the print image examination is performed without performing the data examination. In this case, step S401 is skipped, and the processing proceeds to step S402.

Next, in step S402, the examination apparatus 110 registers a reference image for use as a correct image in the examination. The examination apparatus 110 waits in a reference image reading mode, and a print job for reference image registration is performed from the client PC 130. After the printing is performed, the examination apparatus 110 detects a conveyed sheet, scans the sheet using the image reading unit 310, and stores the scan image as a reference image in the RAM 303 of the examination apparatus 110.

Next, in step S403, the examination apparatus 110 sets various examination parameters such as an examination region and an examination level based on examination settings set by the user. Details of step S403 according to the present exemplary embodiment will be described below.

Next, in step S404, the examination apparatus 110 receives a print job for examination from the client PC 130, detects a conveyed sheet, scans the sheet using the image reading unit 310, and stores the scan image in the RAM 303 of the examination apparatus 110. Then, the examination apparatus 110 examines the scan image based on the job for examination and the reference image registered in step S402 using the examination parameters set in step S403. Details of step S404 according to the present exemplary embodiment will be described below.

The entire process from the registration before an examination is started to the performance of the examination according to the present exemplary embodiment is as described above.

Figure 5:
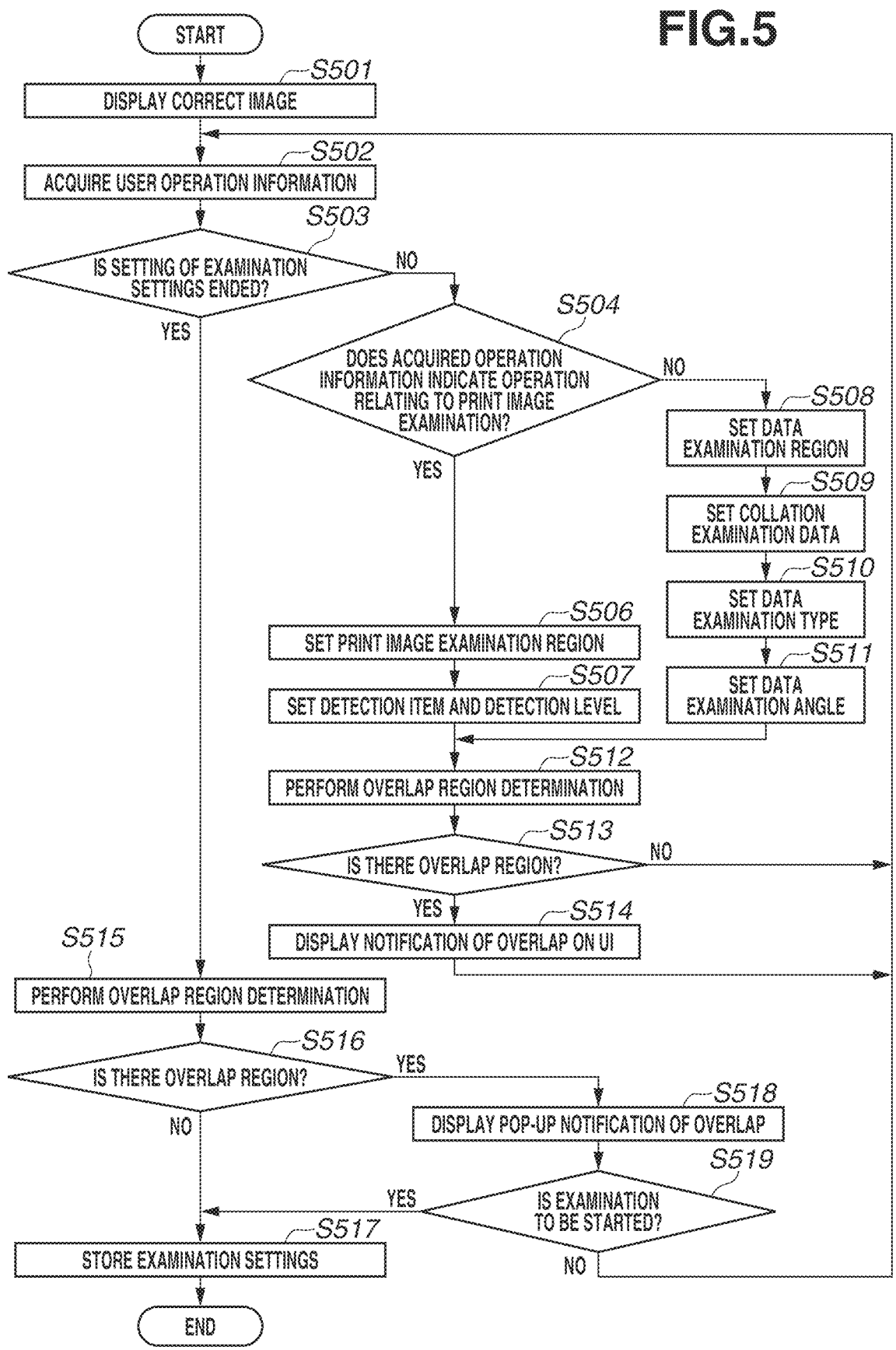
FIG. 5 is a flowchart illustrating an example of a process of setting examination settings in step S403 according to a first exemplary embodiment.

Next, a process for setting the settings for examination in step S403 will be described below with reference to a flowchart in FIG. 5. By performing the process illustrated in the flowchart, the examination apparatus 110 sets various examination parameters such as an examination region and an examination level for the print image examination and the data examination based on the examination settings set by the user. Further, an example of a UI for the examination settings will be described below with reference to FIGS. 7 and 8.

Figure 7:
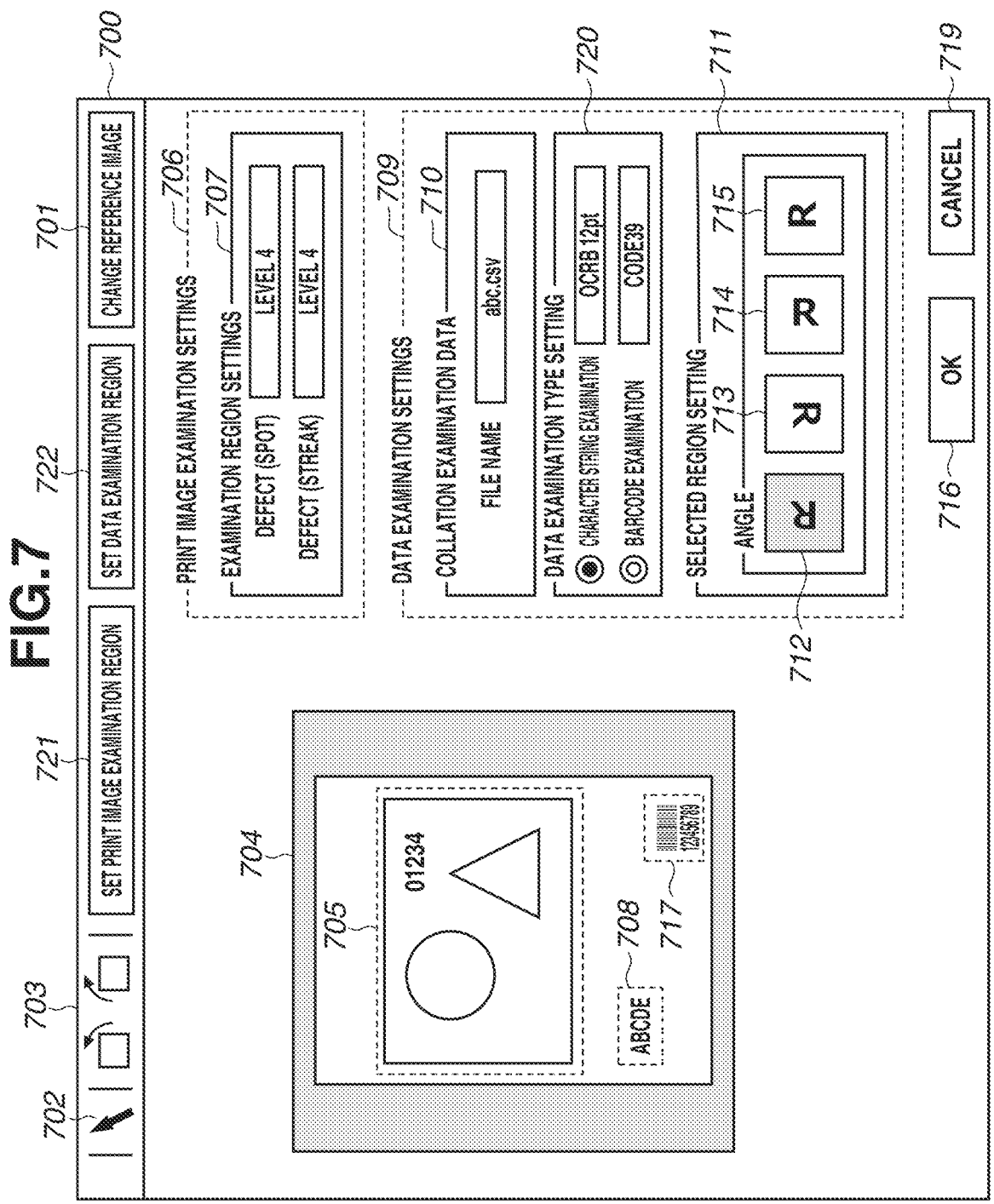
FIG. 7 is a diagram illustrating an example of a user interface (UI) screen for the examination settings according to an exemplary embodiment of the present disclosure.

A UI screen 700 in FIG. 7 is a UI screen displayed on the UI unit 320 of the examination apparatus 110 at the timing of setting the examination settings in step S403. A button 701 is a button for changing the reference image and is used to change the reference image. A button 702 is a button for selecting an examination region and is pressed by the user to change setting information about the preset region. A page preview 704 is a display screen that displays the reference image read in step S402. A button 703 is a button for rotating the image displayed in the page preview 704. A button 716 is a button for performing the examination after the setting of all the examination settings ends. A button 719 is a button for discontinuing the setting of the examination settings. At the press of the button 719 by the user, information being set is revoked, and the setting of the examination settings is ended.

A button 721 is a button pressed by the user to set a print image examination region. A button 722 is a button pressed by the user to set a data examination region.

A UI screen 706 is a UI group for setting a defect detection level in performing the print image examination. Details of the UI screen 706 will be described below.

A UI screen 709 is a UI group for setting a data file to refer to in collating detected data, a type of the data examination, and detailed information about the data examination in performing the data examination. Details of the UI screen 709 will be described below.

First, in step S501, the examination apparatus 110 displays the correct image on the UI unit 320. Specifically, the CPU 302 performs control to display the reference image registered in step S402 (correct image) in the page preview 704 of the UI screen 700.

At this time, the user can issue an instruction to change the displayed reference image. An example of a case where a change is needed is a case where the reference image registered in step S402 includes a defective picture portion. For example, in a case where the reference image includes a scratch as a defect, although a printout is correctly printed, there is a difference between the printout and the reference image, so that the examination cannot be correctly performed. At the press of the button 701 by the user, the examination apparatus 110 waits in the reference image reading mode, and a print job for reference image registration is performed from the client PC 130. After the printing is performed, the examination apparatus 110 detects a conveyed sheet, scans the sheet using the image reading unit 310, and stores the scan image as a reference image in the RAM 303 of the examination apparatus 110. Then, the examination apparatus 110 changes the image displayed in the page preview 704 to the scan image.

In steps S502 to S511, the examination apparatus 110 sets detailed information such as the examination level, the examination type, and the examination region of the print image examination or the data examination based on a user operation. Details thereof will be described below.

In step S502, the examination apparatus 110 acquires operation information from the user via the UI screen 700. The operation information according to the present exemplary embodiment is information about one of a setting operation that relates to the print image examination, a setting operation that relates to the data examination, and an operation of the button 716 to end the setting of the examination settings.

In step S503, the examination apparatus 110 determines whether the operation information acquired in step S502 indicates an operation of the button 716 to input "OK" (to end the setting of the examination settings). In a case where the acquired operation information indicates an operation to input "OK" (YES in step S503), the examination apparatus 110 ends the setting of detailed information such as the examination level, the examination type, and the examination region of the print image examination or the data examination, and the processing proceeds to step S515.

On the other hand, in a case where the acquired operation information does not indicate an operation to input "OK" (NO in step S503), the processing proceeds to step S504.

In step S504, the examination apparatus 110 determines whether the operation information acquired in step S502 indicates an operation that relates to the print image examination. In a case where the acquired operation information indicates an operation that relates to the print image examination (YES in step S504), the processing proceeds to step S506.

In step S506, the examination apparatus 110 sets a print image examination region. A method for setting a print image examination region according to the present exemplary embodiment is as described below. First, the button 721 for setting a print image examination region is pressed by a user operation. Next, a target range of the print image examination in the page preview 704 is designated by a user operation, and the examination apparatus 110 sets the designated range as the print image examination region 705. The print image examination region is an examination region that is a target for the detection of defects in a picture portion of a printout.

Next, in step S507, the examination apparatus 110 sets a detection item of defects to be detected in the print image examination and a detection level of the detection item on a UI screen 707. Then, the processing proceeds to step S512.

The detection item of the print image examination is an item that relates to a characteristic of defects to be detected in examining printouts. Examples are the round defect (spot) and the linear defect (streak). The detection level is a graded parameter that defines a defect size at or above which detected defects are determined as a defect for each characteristic of the detected defects. For example, there are five levels from level 1 to level 5, and thinner and smaller defects are detected at level 5 than at level 1.

Further, the level can be set for each examination item, e.g., examination level 5 for spots and examination level 4 for streaks. The UI screen 707 indicates that level 4 is selected as the examination level for the defect (spot) and also level 4 as the examination level for the defect (streak) by the user.

In a case where the acquired operation information does not indicate an operation that relates to the print image examination (NO in step S504), the processing proceeds to step S508.

In step S508, the examination apparatus 110 sets a data examination region. A method for setting a data examination region according to the present exemplary embodiment is as described below.

First, the button 722 for setting a data examination region in FIG. 7 is pressed by a user operation.

Next, a data examination target range in the page preview 704 is designated by a user operation, and the examination apparatus 110 sets the designated range as the data examination region 708 for character string examination and the data examination region 717 for barcode examination. The data examination regions are examination regions from which a set data type (character string, barcode) is read to determine whether the examination regions are correct or incorrect.

Next, in step S509, the examination apparatus 110 sets by selecting a file a collation examination data file for use as correct character information in determining whether each examination region is correct or incorrect in the data examination in a UI 710.

The collation examination data according to the present exemplary embodiment is a reference comma-separated values (reference CSV) file for the data examination against which data is collated in the data examination. The reference CSV file is a file that is to be prepared in advance by the user and includes a list of correct character strings for the character string examination and the barcode examination. During the data examination, results of reading a character string examination region and a barcode are collated against the correct character strings listed in the reference CSV file. The UI 710 in FIG. 7 indicates that data with the file name "abc.csv" is selected as the collation examination data.

Next, in step S510, the examination apparatus 110 sets the character string examination type or the barcode examination type selected by the user using a pull-down method in a UI screen 720 for a data examination type setting.

A character string type according to the present exemplary embodiment is the glyph font of the glyph registered in step S401. The UI screen 720 in FIG. 7 indicates that the selected glyph font of the selected character string examination is "OCRB 12pt".

Further, a barcode type according to the present exemplary embodiment is a barcode standard supported by the data examination. Any standards supported by the data examination, including one-dimensional barcodes such as CODE 39 and Japanese Article Number (JAN) and two-dimensional codes such as Quick Response (QR) Code® and Data Matrix code, are selectable on the UI screen 720. The UI screen 720 in FIG. 7 indicates that "CODE 39" is selected for the selected barcode examination.

According to the present exemplary embodiment, the examination apparatus 110 sets "OCRB 12pt" as the data examination type because the data examination region 708 is a character string region, and the examination apparatus 110 sets "CODE 39" as the data examination type because the data examination region 717 is a barcode examination region.

Next, in step S511, the examination apparatus 110 sets a direction of reading the character string or the barcode in the data examination by selecting one of direction setting buttons 712 to 715 of a UI screen 711. Then, the processing proceeds to step S512.

The direction setting buttons 712 to 715 respectively correspond to 0°, 90°, 180°, and 270° by the 90 degrees in a clockwise direction from a sheet conveyance direction. The sheet conveyance direction is the left direction from the page preview 704 in FIG. 7, so that an angle setting corresponding to the direction setting button 712 is set to 0°. The direction setting buttons 712 to 715 are set correspondingly to a display angle at which the character string or the barcode in the page preview 704 is displayed. While the direction setting buttons 712 to 715 are used to set the direction of reading a character string or a barcode according to the present exemplary embodiment, a setting method is not limited to the method according to the present exemplary embodiment and can be a UI (e.g., radio button) for setting a direction.

Next, in step S512, the examination apparatus 110 determines whether there is an overlap region by different examination methods using the print image examination region set in step S506 and the data examination region set in step S508. An overlap region determination method will be described below.

For example, in a case where the settings are set as illustrated in FIG. 7, the print image examination region 705, the data examination region 708, and the data examination region 717 include no overlap region, so that the examination apparatus 110 determines that there is no overlap.

Next, in step S513, the examination apparatus 110 checks a result of the determination in step S512. In a case where the examination apparatus 110 determines that there is an overlap region (YES in step S513), the processing proceeds to step S514. On the other hand, in a case where the examination apparatus 110 determines that there is no overlap region (NO in step S513), the processing proceeds to step S502, and the acquisition of user operation information for setting the detailed information such as the examination level, the examination type, and the examination region of the data examination is continued.

In step S514, the examination apparatus 110 displays a notification of the overlap on the UI unit 320 of the examination apparatus 110 to notify the user of the overlap and that the data examination is prioritized in the overlap region. After the examination apparatus 110 completes the notification, the processing proceeds to step S502. At this time, next user operation information is acquired while the notification in step S514 is retained. For example, in a case where the settings are set as illustrated in FIG. 8, it is determined that there is an overlap region, and a notification of a text 802 is presented to the user.

Figure 8:
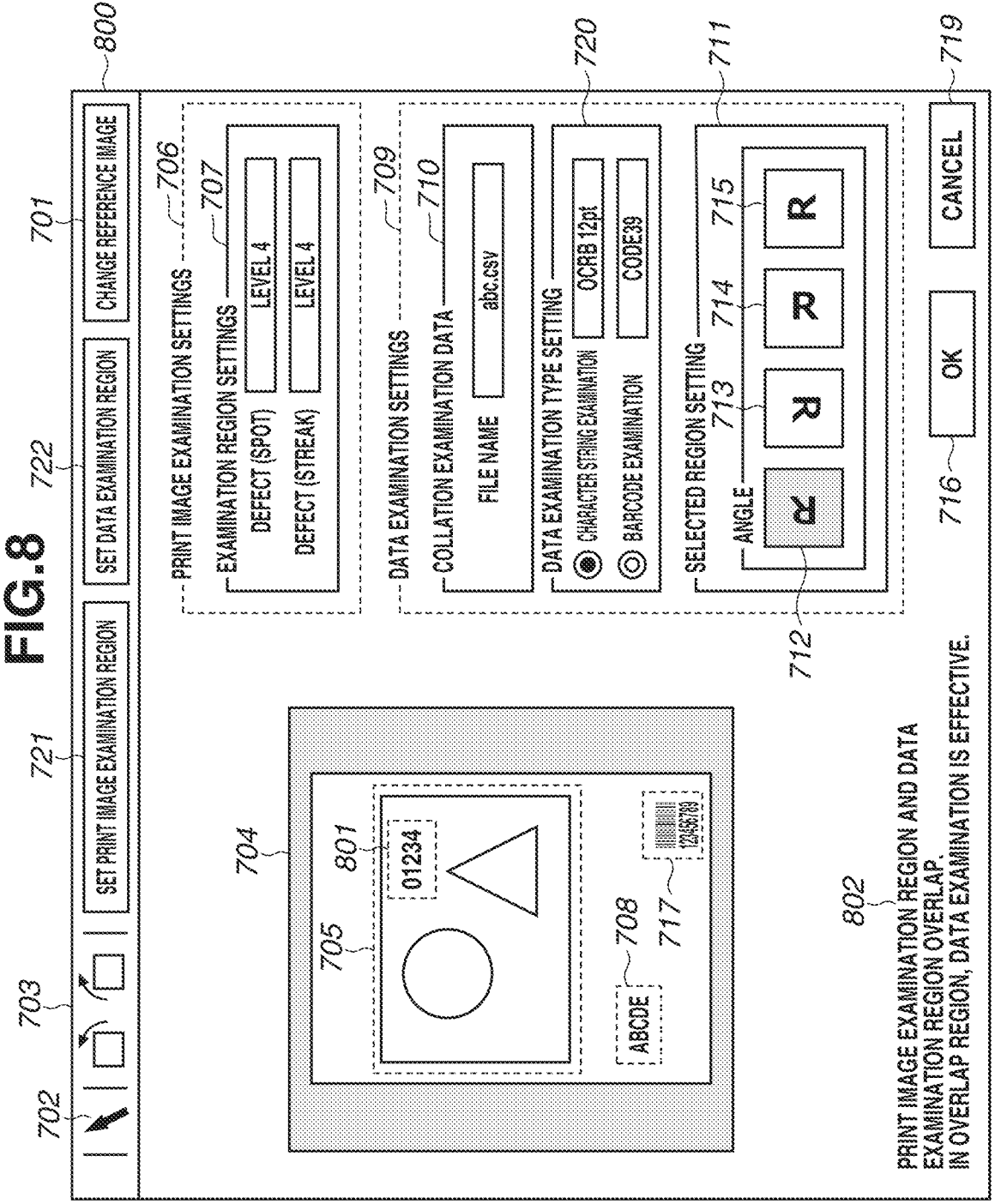
FIG. 8 is a diagram illustrating an example of a UI screen for the examination settings in a case where there is a region overlap according to an exemplary embodiment of the present disclosure.

A UI screen 800 in FIG. 8 is a UI screen displayed on the UI unit 320 of the examination apparatus 110 at a timing when the print image examination region and the data examination region are set with an overlap. The items 701 to 722 in FIG. 8 are similar to those in FIG. 7, so that redundant descriptions thereof are omitted.

A data examination region 801 in FIG. 8 is a region set to perform the data examination on the character string in the print image examination region 705. In a case where the settings are set as illustrated in FIG. 8, the print image examination region 705 and the data examination region 801 include an overlap region, so that the examination apparatus 110 determines that there is an overlap.

Figure 6A:
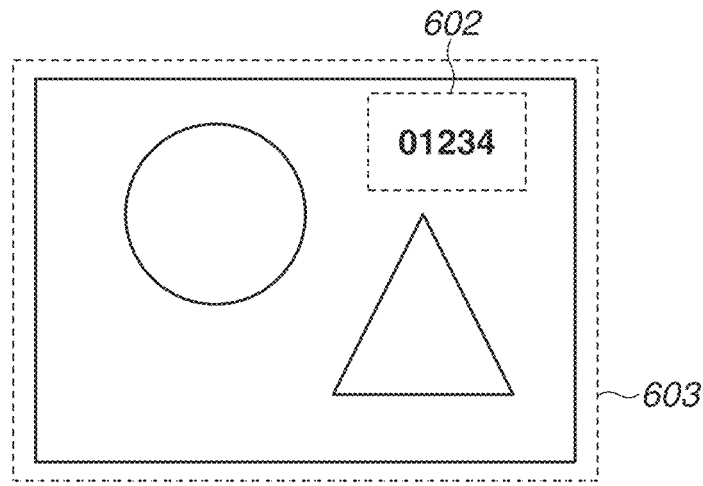
FIGS. 6A and 6B are diagrams illustrating an example of a region overlap according to an exemplary embodiment of the present disclosure.
Figure 6B:
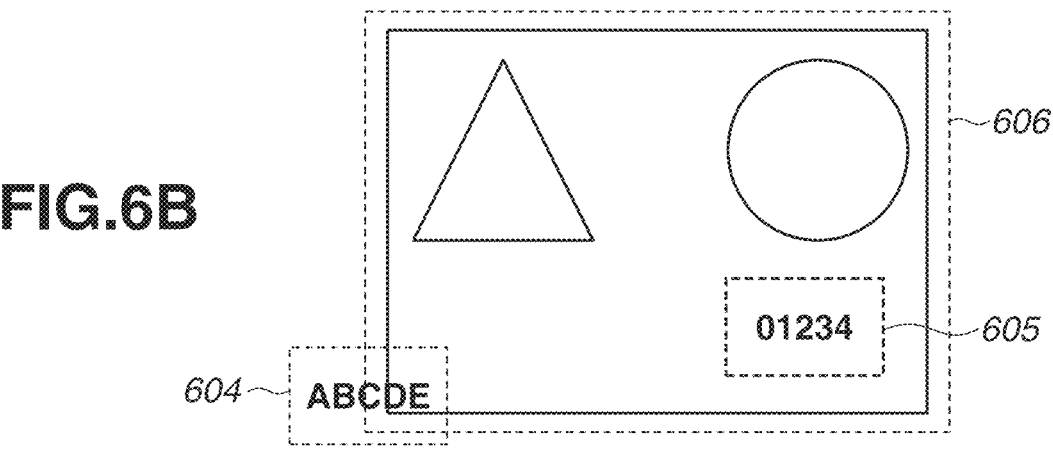

While FIG. 8 illustrates an example where the print image examination region and the data examination region include a single overlap region, the print image examination region and the data examination region can include a plurality of overlap regions as illustrated in FIG. 6B. FIGS. 6A and 6B illustrate a portion of the reference image displayed in the page preview 704 in FIGS. 7 and 8.

The text 802 in FIG. 8 is displayed in a case where it is determined that there is an overlap region in step S512. The text 802 is a message notifying the user that there is an overlap region by different examination methods and that the data examination is enabled in the overlap region. Messages for notifying the user that there is an overlap region by different examination methods and that the data examination is enabled in the overlap region are not limited to the message according to the present exemplary embodiment, and any methods can be used.

Further, in order to make the overlap region clear to the user, the overlap region can be displayed in a color different from colors of frames indicating the print image examination region and the data examination region or can blink. For example, in the case illustrated in FIG. 6B, the entire data examination region 605 that overlaps and the overlapping portion of the data examination region 604 can be filled with a prominent color. This enables the user to recognize the overlap regions with ease.

In a case where the OK button 716 is pressed (YES in step S503), the processing proceeds to step S515.

In step S515, the examination apparatus 110 determines whether an overlap region by different examination methods is set using the print image examination region and the data examination region set in steps S504 to S511. This determination is similar to the examination region overlap determination in step S512. A method for the examination region overlap determination will be described below with reference to FIGS. 6A and 6B.

The data examination regions 601 and 602 in FIG. 6A are character strings of variable data that may change from page to page, so that the data examination regions 601 and 602 are examination regions for performing the readability examination or the data collation examination as the data examination. The print image examination region 603 is an examination region for performing the detection of defects in each picture portion of the printout.

Similarly, the data examination regions 604 and 605 in FIG. 6B are examination regions for performing the readability examination or the data collation examination as the data examination. The print image examination region 606 is an examination region for performing the detection of defects in each picture portion of the printout. Examination regions can be set to partially overlap, similarly to the examination regions 604 and 606 in FIG. 6B.

In order to determine whether there is an overlap of examination regions, first, whether two examination regions include a common area in each of horizontal and vertical directions is checked. Next, in a case where there is a common area in each of the horizontal and vertical directions, it is determined that the two examination regions overlap, whereas in a case where there is no common area in one of the horizontal and vertical directions, it is determined that the two examination regions do not overlap.

This determination is performed with respect to all combinations of different examination methods, and in a case where the examination regions overlap by any of the combinations, it is determined that the examination regions overlap in step S515, whereas in a case where the examination regions do not overlap with respect to all of the combinations, it is determined that the examination regions do not overlap in step S515.

In the case of FIG. 6A, a combination of the data examination region 601 and the print image examination region 603 and a combination of the data examination region 602 and the print image examination region 603 are formed, and the overlap region determination is performed twice in total. In the case of the data examination region 601 and the print image examination region 603, since the data examination region 601 and the print image examination region 603 include a common area in the horizontal direction but does not include a common area in the vertical direction, it is determined that the data examination region 601 and the print image examination region 603 do not overlap. Similarly, in the case of the data examination region 602 and the print image examination region 603, since the data examination region 602 and the print image examination region 603 include a common area in the horizontal direction and a common area in the vertical direction, it is determined that the data examination region 602 and the print image examination region 603 overlap.

In the case of FIG. 6B, a combination of the data examination region 604 and the print image examination region 606 and a combination of the data examination region 605 and the print image examination region 606 are formed, and the overlap region determination is performed twice in total. In the case of the data examination region 605 and the print image examination region 606, since the data examination region 605 and the print image examination region 606 include a common area in the horizontal direction and a common area in the vertical direction, it is determined that the data examination region 605 and the print image examination region 606 overlap. Similarly, in the case of the data examination region 604 and the print image examination region 606, since the data examination region 604 and the print image examination region 606 include a partially common area in the horizontal direction and a partially common area in the vertical direction, it is determined that the data examination region 604 and the print image examination region 606 overlap. Therefore, it is determined that FIG. 6B includes two overlap regions.

While the overlap region determination is performed by the above-described method, methods for the overlap region determination are not limited to the method according to the present exemplary embodiment, and any methods for the overlap region determination can be used.

Next, in step S516, the examination apparatus 110 checks a result of the overlap region determination in step S515. In a case where it is determined that there is no overlap region (NO in step S516), the processing proceeds to step S517. On the other hand, in a case where it is determined that there is an overlap region in step S516 (YES in step S516), the processing proceeds to step S518.

In step S517, the examination information set in step S502 is stored, and the process ends.

Figure 9:
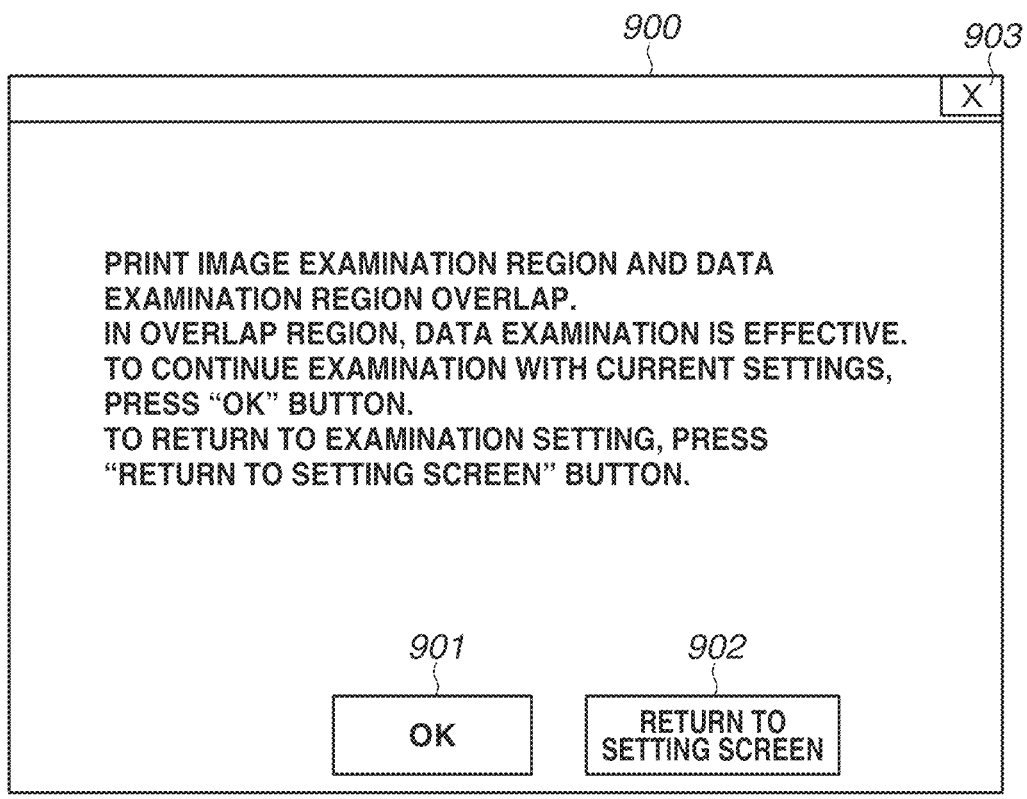
FIG. 9 is a diagram illustrating an example of a pre-examination UI screen in a case where there is a region overlap according to an exemplary embodiment of the present disclosure.

In step S518, the examination apparatus 110 displays a pop-up notification, e.g., a pop-up notification illustrated in FIG. 9, on the UI unit 320 of the examination apparatus 110 and notifies the user that the button 716 in FIG. 7 is pressed with the examination regions overlapping.

The display in step S518 and the notification in step S514 are both intended to notify the user of the overlap region but use a different display method. In step S514, the overlap region determination is performed each time a region is selected, and a notification such as the text 802 in FIG. 8 is provided. In step S518, on the contrary, the overlap region determination is performed after all the user settings are ended, and a pop-up display is provided.

Depending on the user settings, only the display at the end of the setting (step S518) can be performed without performing the notification during the setting (step S514). Conversely, only the notification during the setting (step S514) can be performed without performing the display at the end of the setting (step S518).

A UI screen 900 in FIG. 9 is a pop-up UI screen displayed on the UI unit 320 of the examination apparatus 110 at a timing of ending the setting of the examination settings with the examination regions overlapping in step S516. The UI screen 900 is a UI that displays an element indicating that the data examination is enabled in the overlap region and that prompts the user to select whether to continue the examination or to return to the examination settings without performing the examination in a case where the examination regions overlap.

A button 901 is a button for performing the examination with the overlap region set.

A button 902 is a button for displaying the UI screen 700, which is an examination settings screen, to perform the process again from step S501 for setting the examination settings again. A button 903 is a button for hiding the pop-up screen 900.

The examination apparatus 110 continues displaying the UI screen 900 until one of the "OK" button 901, the "RETURN TO SETTING SCREEN" button 902, and the close button 903 is selected based on a user operation.

While FIG. 9 is displayed in the pop-up form overlapping the UI screen 700 in FIG. 7 on the UI unit 320 of the examination apparatus 110 according to the present exemplary embodiment, the display is not limited to this form. For example, the screen can be changed from the UI screen 700 to the UI screen 900. Further, a notification method by displaying a warning mark on an icon can be used. Further, a notification method using a warning sound or a voice can be used.

Next, in step S519, the examination apparatus 110 determines whether the "OK" button 901 for starting the examination is selected by the user operation in step S518. In a case where the "OK" button 901 is selected (YES in step S519), the examination apparatus 110 performs step S517. On the other hand, in a case where the "OK" button 901 is not selected in step S518 (NO in step S519), the processing returns to step S502, and the examination settings are set again.

A process for setting the examination settings according to the present exemplary embodiment is as described above.

Figure 10:
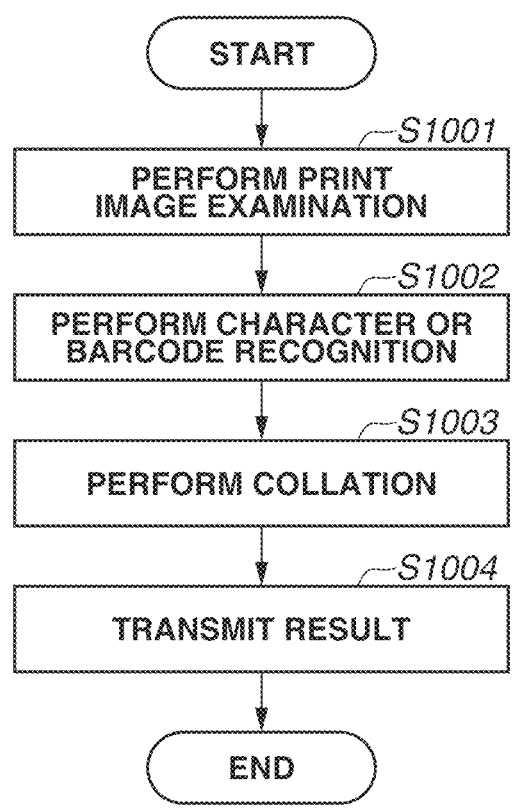
FIG. 10 is a flowchart illustrating an example of a process of performing the examination in step S404 according to an exemplary embodiment of the present disclosure.

Next, operations of the examination apparatus 110 after the setting of the examination settings to perform the examination in step S404 will be described below with reference to a flowchart in FIG. 10. At the press of an examination start button (not illustrated) displayed on the UI unit 320 by the user, the examination apparatus 110 performs the examination using the examination processing unit 305.

First, in step S1001, the examination processing unit 305 detects the defect (spot) and the defect (streak) contained in the sheet as a printing defect based on the examination settings set by the user in step S403. A method for detecting a printing defect according to the present exemplary embodiment is a method in which a difference between the reference image registered in step S402 and the scan image of the corresponding print job is extracted and the defect (spot) and the defect (streak) are detected based on a feature of the extracted difference image. Methods for detecting printing defects are not limited to the method according to the present exemplary embodiment, and a publicly-known method can be used.

Next, in step S1002, the examination processing unit 305 performs OCR or barcode recognition on the data examination region based on the examination settings set by the user in step S403. OCR according to the present exemplary embodiment is performed by the following process. First, characters in an OCR target region are cut one by one. Then, a similarity between the glyph image registered in the glyph font and each cut character is calculated using the glyph font registered in step S401, and the character code corresponding to the glyph image with the highest similarity is obtained as a result for the single character. Then, the results for all the cut characters are combined together to obtain a character string as an OCR result. OCR methods using the glyph font are not limited to the method according to the present exemplary embodiment, and a publicly-known method can be used.

Next, in step S1003, the examination processing unit 305 collates the character recognition result or the barcode recognition result obtained in step S1002 against the correct character strings listed in the collation examination file set in step S509. Then, a result of this determination about correctness/incorrectness is output as an examination result.

Next, in step S1004, the examination processing unit 305 transmits the examination result obtained in step S1003 to the UI unit 320.

After receiving the examination result, the UI unit 320 displays the examination target scan image and the examination result to the user. In a case where the printout contains a defect, the UI unit 320 emphasizes the detected defect using a dotted or color frame on the scan image and also displays the type (spot, streak) of the detected defect and the position information. On the other hand, in a case where the printout is not defective, a character string indicating that no defect is contained is displayed. Examination result display methods by the UI unit 320 are not limited to those described above, and any methods by which detection results are displayed clearly to the user can be used.

Further, the examination processing unit 305 transmits the examination result obtained in step S1003 also to the image forming apparatus 100 and the finisher 120.

The information transmitted to the image forming apparatus 100 is information indicating that a predetermined number of defective printouts are consecutively output, and the information transmitted to the finisher 120 is information about whether the printouts are defective.

As described above, after receiving the information, the image forming apparatus 100 stops the printing operation. Further, the finisher 120 discharges each printout without a defect to the normal sheet discharge tray and discharges each defective printout to the other tray different from the normal sheet discharge tray using the received information.

The operations of the examination apparatus 110 in performing the examination in step S404 are as described above.

As described above, according to the present exemplary embodiment, in a case where the user overlaps a region set for the print image examination with a region set for the data examination, the user is notified of the overlap by two types of methods by displaying a message indicating the overlap in the UI during the setting or by displaying a pop-up notification after the setting. Thus, a notification indicating that the print image examination and the data examination have an exclusive processing relationship is displayed on the UI, and this notifies the user of the exclusive relationship.

In the method according to the above-described exemplary embodiment, the reference image for use in the print image examination is registered in advance, and the common reference image is used in examining a plurality of printouts. Operations in a case where an individual reference image for use in examining a plurality of printouts is generated for each of the plurality of printouts and a mode for performing the examination is selected according to another exemplary embodiment will be described below.

Differences between the other exemplary embodiment and the above-described exemplary embodiment will be described below. Portions without detailed description are similar to those according to the first exemplary embodiment.

According to the other exemplary embodiment, two modes for changing a method for generating a reference image and performing the examination are included. The first mode is a page common mode. In the page common mode, a common reference image is generated even in a case where a plurality of printouts is to be examined, and the print image examination is performed using the common reference image. For example, in a case where an entire page layout is the same and only a destination portion differs for each page, an image generated by printing only the portion common to all pages without printing the destination portion is used as a reference image. The page common mode is similar to the page common mode according to the first exemplary embodiment, so that redundant descriptions thereof are omitted.

The second mode is a page individual mode. In the page individual mode, in a case where a plurality of printouts is to be examined, an individual reference image is generated for each of the plurality of printouts, and the print image examination is performed using the individually generated reference images. For example, in a case where an image with an entire page layout changed by the user is to be printed, a common reference image cannot be generated. Thus, images with different layouts for different users are used as reference images. There are two methods for generating a reference image in the page individual mode. In the first method, a reference image is generated by performing a print job and scanning a printout using the image reading unit 310 as in the first exemplary embodiment. In the second method, instead of using a scan image, image data after RIP processing of analyzing a print job and generating image data is used as a reference image. In the page individual mode, since the individual reference images are generated, the print image examination region and the data examination region can be simultaneously examined even in a case where the print image examination region and the data examination region overlap. Specifically, since the reference images corresponding to the variable region in variable printing are generated, only image defects can be detected in the print image examination.

An example of a UI for switching between the page individual mode and the page common mode will be described below with reference to FIG. 12.

Figure 12:
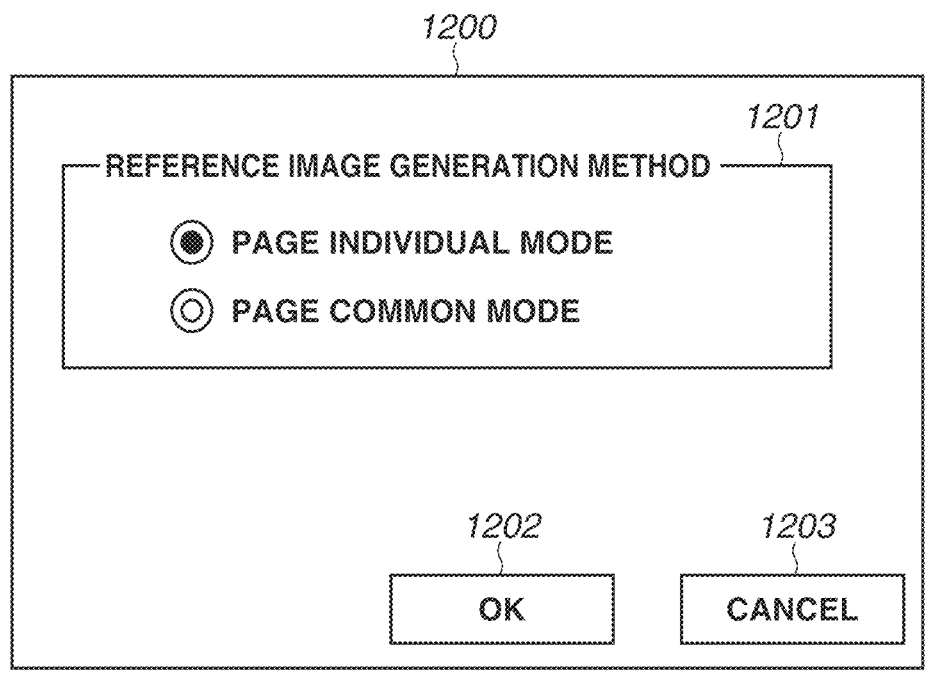
FIG. 12 is a diagram illustrating an example of a UI screen for setting a reference generation mode according to another exemplary embodiment.

A UI screen 1200 in FIG. 12 is a UI screen displayed on the UI unit 320 of the examination apparatus 110 in switching between the page individual mode and the page common mode. The UI screen 1200 is displayed at a timing of setting advanced settings of a main body of the examination apparatus 110. The user selects one of the page individual mode and the page common mode and sets the selected mode.

A radio button 1201 is a button for setting one of the page individual mode and the page common mode. In FIG. 12, the page individual mode is selected as an example. A button 1202 is a button for ending the mode setting and storing the setting of the radio button 1201 selected by the user. A button 1203 is a button for stopping the mode setting and is a button for revoking the selected information and ending the setting.

Figure 11:
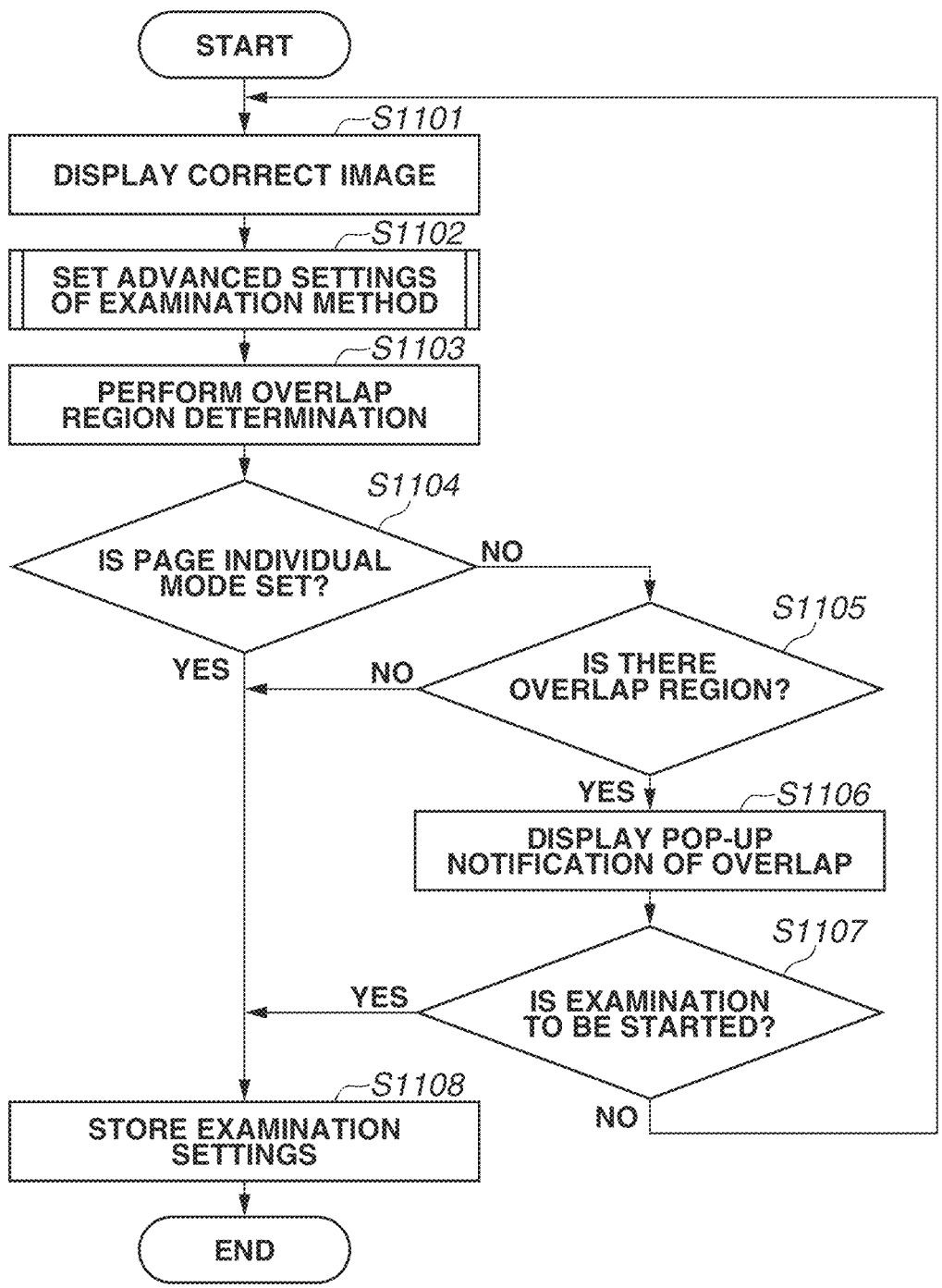
FIG. 11 is a flowchart illustrating an example of a process of setting examination settings in step S403 according to another exemplary embodiment.
Figure 13:
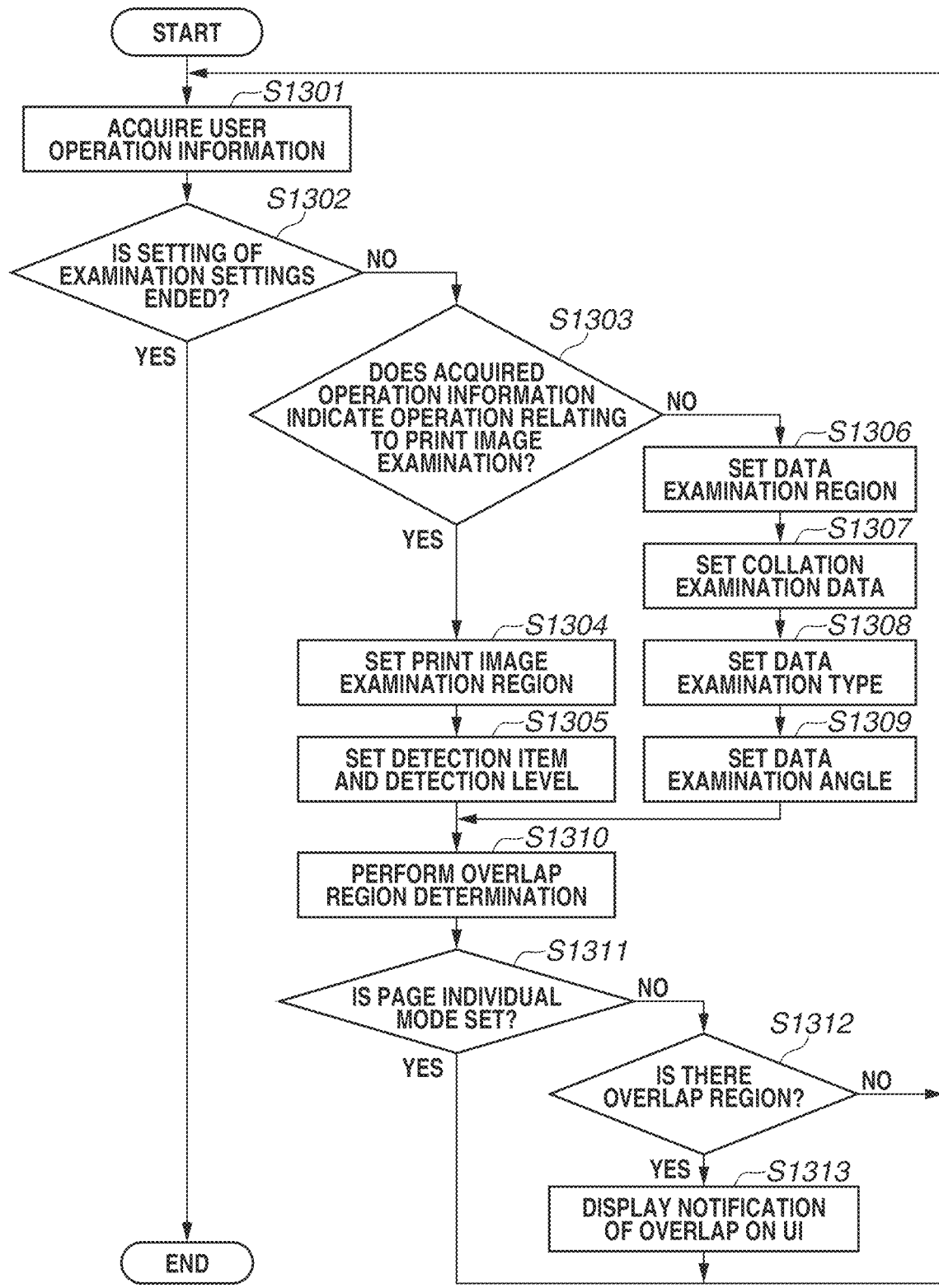
FIG. 13 is a flowchart illustrating an example of a process of setting advanced settings of an examination method according to another exemplary embodiment.

Next, a process of setting the examination settings in step S403 according to the other exemplary embodiment will be described below with reference to a flowchart in FIG. 11. By performing the process illustrated in the flowchart, the examination apparatus 110 sets various examination parameters for the print image examination and the data examination such as the examination region and the examination level based on the examination settings set by the user. Further, an example of UIs that relate to the examination settings will be described below with reference to FIG. 7. Step S1101 is similar to step S501 according to the first exemplary embodiment, so that redundant descriptions thereof are omitted. A process of setting advanced settings of the examination method in step S1102 is illustrated in FIG. 13. Step S1103 is similar to step S515 according to the first exemplary embodiment, so that redundant descriptions thereof are omitted.

Next, in step S1104, the examination apparatus 110 performs determination using the reference image generation mode setting on the UI screen 1200. In a case where the examination apparatus 110 determines that the page individual mode is set (YES in step S1104), in step S1108, the examination apparatus 110 stores examination information set in step S1302, and the setting of the examination settings ends.

On the other hand, in a case where the examination apparatus 110 determines that the page individual mode is not set (NO in step S1104), in step S1105, the examination apparatus 110 checks the result of the overlap region determination performed in step S1103. In a case where the examination apparatus 110 determines that there is no overlap region (NO in step S1105), in step S1108, the examination apparatus 110 stores the examination information set in step S1102, and the setting of the examination settings in step S403 ends.

On the other hand, in a case where the examination apparatus 110 determines that there is an overlap region (YES in step S1105), in step S1106, the examination apparatus 110 displays the UI screen 900 in the pop-up form using the UI unit 320 of the examination apparatus 110 as in the first exemplary embodiment.

Next, step S1107 is similar to step S519, so that redundant descriptions thereof are omitted.

A process for setting the examination settings in step S403 according to the present exemplary embodiment is as described above.

Next, a process of setting detailed information such as the examination level, the examination type, and the examination region for the print image examination or the data examination in step S1102 will be described below with reference to a flowchart illustrated in FIG. 13. Step S1301 follows step S1101, and in a case where the examination apparatus 110 determines that the setting is to be ended (YES in step S1302), the processing proceeds to step S1103. By performing the process illustrated in the flowchart, the examination apparatus 110 sets various examination parameters such as the examination region and the examination level for the print image examination or the data examination. Steps S1301 to S1310 are similar to steps S502 to S512 according to the first exemplary embodiment, so that redundant descriptions thereof are omitted.

Next, in step S1311, the examination apparatus 110 checks the reference image generation mode setting on the UI screen 1200, and in a case where the examination apparatus 110 determines that the page individual mode is set (YES in step S1311), the processing proceeds to step S1301. On the other hand, in a case where the examination apparatus 110 determines that the page common mode is set (NO in step S1311), in step S1312, the examination apparatus 110 checks a result of the overlap region determination in step S1310. In a case where there is no overlap region (NO in step S1312), the processing proceeds to step S1301. On the other hand, in a case where there is an overlap region (YES in step S1312), in step S1313, the examination apparatus 110 displays a notification of the overlap on the UI unit 320 of the examination apparatus 110 to notify the user of the overlap and that the data examination is prioritized in the overlap region. A method for the notification using the UI is similar to the method according to the first exemplary embodiment, so that redundant descriptions thereof are omitted.

A process for setting the advanced settings such as the examination level, the examination type, and the examination region for the print image examination or the data examination in step S1102 according to the present exemplary embodiment is as described above.

As described above, according to the present exemplary embodiment, in a case where the page common mode is set and the user overlaps the regions set for the print image examination and the data examination, the user is notified of the overlap. In a case where the page individual mode is set, the print image examination region and the data examination region can be simultaneously examined even in a case where the print image examination region and the data examination region overlap, so that the notification to the user becomes unnecessary. Thus, only in a state where the page common mode is set, a notification indicating that the print image examination and the data examination have an exclusive processing relationship is displayed on the UI, and this notifies the user of the exclusive relationship.

Other Exemplary Embodiments

While various examples and implementations of exemplary embodiments have been described above, the spirit and scope of the exemplary embodiments are not limited to any specific descriptions in the present specification.

The exemplary embodiments are also realized by the following process. Specifically, a program for realizing one or more functions of the above-described implementations is supplied to a system or an apparatus via a network or a storage medium, and one or more processors of a computer of the system or the apparatus read the program and execute the read program.

The exemplary embodiments are also realized by a circuit (e.g., application-specific integrated circuit (ASIC)) that realizes one or more functions.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-135584, filed Aug. 23, 2021, which is hereby incorporated by reference herein in its entirety.

What is claimed is:

1. A printing system comprising:
   one or more controllers having one or more processors and one or more memories, the one or more controllers configured to cause the printing system to:
   print an image on a recording sheet, the image including a variable region where an image printed on a first page and an image printed on a second page differ and a fixed region where an image printed on the first page and an image printed on the second page are the same;
   read a printout printed by the printing and generate a scan image;
   display a reference image including at least the fixed region on a display unit;
   examine, as a first examination, the printout based on at least the fixed region of the scan image and the reference image;
   examine, as a second examination, data acquired from the printout based on data acquired from an image printed in the variable region of the scan image and reference data;
   set at least a first region to be examined by the first examination and a second region to be examined by the second examination in the reference image displayed on the display unit; and
   provide, in a case where the first region and the second region include an overlap region, a notification of overlap of the first region and the second region.

2. The printing system according to claim 1, wherein the overlap region of the first region and the second region is examined by the second examination and is not examined by the first examination.

3. The printing system according to claim 1, wherein in a case where the first region and the second region include the overlap region during the setting of the first region and the second region, a notification of the overlap region is provided via a user interface (UI) screen via which the setting is performed.

4. The printing system according to claim 1, wherein in a case where the setting of the first region and the second region is ended and the first region and the second region include one or more overlap regions, a pop-up notification of the overlap region is provided.

5. The printing system according to claim 1, wherein the second examination is performed based on the reference data and data read from a character string or a barcode printed in the variable region.

6. The printing system according to claim 1, wherein the first examination examines the printout based on a comparison between the generated scan image and the reference image corresponding to the scan image.

7. The printing system according to claim 1, wherein the reference image includes the generated scan image.

8. The printing system according to claim 1, wherein the reference image includes image data on which raster image processor (RIP) processing is performed.

9. The printing system according to claim 1, wherein the printing system includes a printing apparatus configured to perform the printing an image on a recording sheet and an examination apparatus configured to perform the generating the scan image, display control to display the reference image, the setting of the first region and the second region, the first examination, the second examination, and the providing the notification.

10. A printing system comprising:
    a printing unit configured to print an image on a recording sheet, the image including a variable region where an image printed on a first page and an image printed on a second page differ and a fixed region where an image printed on the first page and an image printed on the second page are the same;
    a generation unit configured to read a printout printed by the printing unit and generate a scan image;
    a selection unit configured to select a page common mode in which a reference image including at least the fixed region is registered and a page individual mode in which a reference image for the first page and a reference image for the second page are registered;
    a display control unit configured to display the reference image on a display unit;
    a first examination unit configured to examine the printout based on the scan image and the reference image;
    a second examination unit configured to examine data acquired from the printout based on data acquired from the scan image and reference data;
    a setting unit configured to set at least a first region to be examined by the first examination unit and a second region to be examined by the second examination unit in the reference image; and
    a notification unit configured to provide a notification of overlap of the first region and the second region,
    wherein in a case where the first region and the second region include an overlap region and the page common mode is selected by the selection unit, the notification unit provides the notification of the overlap of the first region and the second region.

11. The printing system according to claim 10, wherein in a case where the first region and the second region include the overlap region and the page individual mode is selected by the selection unit, the notification unit does not provide the notification of the overlap of the first region and the second region.

12. An examination apparatus comprising:
    a generation unit configured to read a printout and generate a scan image on a recording sheet, the printout including a printed image including a variable region where an element of an image printed on a first page and an element of an image printed on a second page differ and a fixed region where an element of an image printed on the first page and an element of an image printed on the second page are the same;
    a display control unit configured to display a reference image including at least the fixed region on a display unit;
    a first examination unit configured to examine the printout based on at least the fixed region of the scan image and the reference image;
    a second examination unit configured to examine data written on the printout based on data read from an image printed in the variable region of the scan image and reference data;
    a setting unit configured to set at least a first region to be examined by the first examination unit and a second region to be examined by the second examination unit in the reference image displayed on the display unit; and
    a notification unit configured to provide, in a case where the first region and the second region include an overlap region, a notification of overlap of the first region and the second region.

13. A method for controlling a printing system, the method comprising:
- printing an image on a recording sheet, the image including a variable region where an image printed on a first page and an image printed on a second page differ and a fixed region where an image printed on the first page and an image printed on the second page are the same;
- reading a printout printed by the printing and generating a scan image;
- displaying a reference image including at least the fixed region on a display unit;
- examining, as a first examination, the printout based on at least the fixed region of the scan image and the reference image;
- examining, as a second examination, data acquired from the printout based on data acquired from an image printed in the variable region of the scan image and reference data;
- setting a first region to be examined by at least the first examination and a second region to be examined by the second examination in the reference image displayed on the display unit; and
- providing, in a case where the first region and the second region include an overlap region, a notification of overlap of the first region and the second region.

* * * * *